United States Patent Office 3,154,574
Patented Oct. 27, 1964

3,154,574
BIS(p-1,1,3,3-TETRAMETHYLBUTYLPHENYL)-
2,4-DIHYDROXYISOPHTHALATE
David A. Gordon and Charles W. Hinman, Midland, Mich., assignors to The Dow Chemical Company, Midland, Mich., a corporation of Delaware
No Drawing. Filed Mar. 13, 1958, Ser. No. 721,087
1 Claim. (Cl. 260—473)

This invention relates to new organic compounds and to polymeric compositions containing the same. More particularly, it relates to new organic compounds finding utility as light stabilizers for haloethylene polymers.

This application is a continuation-in-part of U.S. Serial No. 558,610, filed January 12, 1956, now abandoned.

Haloethylene polymers, such as those containing at least 50 percent vinylidene chloride, are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light.

Several of such compounds, however, are colored materials which impart an objectionable initial color to the stabilized composition which prevents the production of a commercially saleable white composition.

Still other disadvantages of many of the previous compounds are a high odor level and volatility. Obviously, any odor in the stabilizer will be transferred to the stabilized composition. When volatile stabilizers are employed the stabilizers volatilize out of the composition leaving the composition in time unprotected against the degradative effects of light, particularly ultraviolet light. In addition, all of the compounds vary in their ability to absorb ultraviolet light and it is impossible to predict the effectiveness of any particular compound with any degree of certainty, and even then some of the compounds lose some of their effectiveness for absorbing ultraviolet light over a prolonged period of time.

In view of the above problems it would be desirable and it is the principal object of this invention to provide a new group of organic compounds having the stated utility.

It is a further object to provide a polymeric composition stabilized against the degradative effects of light by means of such compounds.

It is a still further object to provide a group of such compounds which have little or no color and have a low odor level.

Another object is to provide a group of such compounds which have low volatility.

The above and related objects are accomplished by means of a group of esters having the general formula:

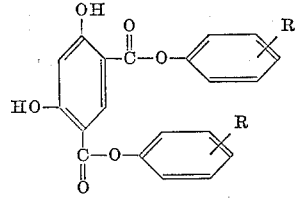

wherein R is selected from the group consisting of hydrogen and alkyl groups having from 1 to about 8 carbon atoms. The invention likewise includes compositions comprising thermoplastic haloethylene polymers stabilized with the esters.

The compounds may be prepared from readily available materials using standard laboratory methods. As illustrative of the preparation the method of preparing diphenyl-4,6-dihydroxyisophthalate will be described. A quantity of resorcinol was mixed with an excess of twice the molar amount of anhydrous potassium carbonate. The mixture was placed in a dry, stainless steel bomb and the oxygen expelled with nitrogen. The bomb was pressurized with dry carbon dioxide to 1,200 p.s.i. at room temperature. The bomb rocker was set in motion and heat applied until a runaway was noted. The runaway usually occurred at about 140° C. to 150° C. and carried the temperature up to about 230° C. During this time carbon dioxide was rapidly absorbed and the bomb had to be repressurized. The temperature was maintained at 230° C. until carbon dioxide was no longer absorbed.

After cooling and venting the contents of the bomb were washed out with water and enough water added to dissolve the reaction product. The solution was filtered, acidified, and the solid dihydroxy dicarboxylic acid collected on a Büchner funnel. The acid was purified further by redissolving it in sodium bicarbonate solution, filtering, and reprecipitating the acid with concentrated hydrochloric acid. Analytical samples for proving the structure were obtained by recrystallization from ethanol or n-butanol. The product was in the form of white crystals melting at 312° C.

The diphenyl ester was prepared by mixing together the 4,6-dihydroxyisophthalic acid, twice the molar amount of the acid of phenol, and toluene. The mixture was agitated and phosphorus oxychloride added slowly. The temperature was maintained at 100° C. throughout the addition. After hydrogen chloride was no longer given off, the mixture was heated to 110° C. for 30 minutes. After cooling cracked ice was added and the water layer was separated and washed once with toluene. The combined toluene fractions were distilled at reduced pressure and the residue taken up with hot ethanol. After cooling a tan crystalline solid separated. The solid was treated with activated charcoal and recrystallized from butanol. The diphenyl-4,6-dihydroxyisophthalate was in the form of white odorless crystals melting at 162.5°–163° C. The ester was found to be soluble in hot chlorine containing solvents such as methylene chloride, methyl chloroform, perchloroethylene, and chlorobenzene, warm butanol, and organic esters. The alkyl phenyl derivatives may be prepared by employing the corresponding phenol. For example, when 2.2 moles of p(1,1,3,3-tetramethylbutyl)-phenol is employed in an esterification reaction with 1 mole of 4,6-dihydroxyisophthalic acid in 100 milliliters of perchloroethylene using 1 mole of $POCl_3$, the result was bis(p-1,1,3,3-tetramethylbutylphenyl)-4,6-dihydroxyisophthalate. The product was a white solid melting at 196.5–197.5° C. The structure was confirmed by infrared analysis.

It should be apparent that the other esters included within the general formula may be made by a similar procedure using suitably substituted phenols. Examples of the contemplated esters are the isopropyl, t-butyl, t-amyl, and t-octyl esters of 4,6-dihydroxy isophthalic acid.

The polymers which may be employed in the light stable compositions of this invention are those containing any halogen. As typical examples may be mentioned the polymers and copolymers of vinylidene chloride and the polymers and copolymers of vinyl chloride. The polymers composed predominantly of vinylidene chloride are known to be especially sensitive to light and such polymers are preferred in these compositions.

The phenyl and alkyl phenyl esters of this invention effectively stabilize compositions based on the abovementiond haloethylene polymers when employed in amounts of from 1 to 10 percent based on the weight of the polymer. It is preferred to use from 1 to 5 percent. A trained investigator will be able to determine the optimum amount needed by simple preliminary expriment. The corresponding alkyl esters impart practically no such stabilization tendency to these compositions.

Since the esters are white and odorless, odor-free compositions may be prepared in white and pastel shades extending greatly the merchandisability of articles prepared from such compositions. In addition, the esters are relatively non-volatile so that they offer permanent protection to the compositions.

The compositions may contain the other common additives which are incorporated into polymer formulations. Thus, heat stabilizers, pigments, fillers and lubricants may be added to the compositions without affecting the light stabilizing effectiveness of the esters. Also, other light stabilizers such as salol may be employed in conjunction with the esters of this invention.

The advantages of the compositions of this invention will be apparent from the following illustrative examples wherein all parts are by weight.

*Example 1*

A series of samples was prepared from a basic formulation consisting of 87.3 parts of a polymer prepared from 85 percent vinylidene chloride and 15 percent vinyl chloride, together with 7 parts of a tetraester of pentaerythritol as a plasticizer, 0.5 part of sodium tripolyphosphate, 0.5 part of disodium lauryl phosphate, and 0.2 part of citric acid as a heat stabilizer, and 1 part of titanium dioxide as a pigment. One of the samples was left as a blank. To another of the samples was added 2 percent of 5-chloro-2-hydroxybenzophenone, a known light stabilizer. To the others were added, 1, 2, or 4 percent of diphenyl-4,6-dihydroxyisophthalate. Moldings were prepared from each of the samples. The moldings were exposed to RS sunlamps for 42 days. The moldings were examined periodically for signs of degradation and rated according to an arbitrary scale wherein 1 indicated white, 11 a light tan, 13 tan, 15 light brown, and 19 brown. The results are listed in Table I.

*Table I*

| Stabilizer | Percent added | Color rating after days exposure | | |
|---|---|---|---|---|
| | | 1 | 7 | 42 |
| 5-chloro-2-hydroxybenzophenone | 2 | 12 | 18 | 23 |
| Diphenyl-4,6-dihydroxyisophthalate | 1 | 7 | 13 | 19 |
| Do | 2 | 3 | 9 | 14 |
| Do | 4 | 3 | 7 | 12 |
| | | 2 | 6 | 10 |

The results show that the isophthalates of this invention provide stabilized compositions which are considerably more resistant to the degradative effects of light than compositions stabilized with prior known stabilizing agents.

EXAMPLE 2

Samples were prepared by blending 88.15 parts of the copolymer of Example 1, 7 parts of a tetraester of pentaerythritol sold commercially as Hercoflex 600 by the Hercules Powder Company, 0.5 part of sorbitan monostearate, 0.3 part of citric acid, 0.05 part maleic anhydride, and 1 part of titanium dioxide. Testing specimens were prepared by compression molding samples of the formulation, one of which was unstabilized and was a control and one of which contained in addition to the listed ingredients, 3 percent of bis(p-1,1,3,3-tetramethylbutylphenyl)-4,6-dihydroxyisophthalate. The specimens were exposed to sunlamps as shown in Example 1 with the following results.

*Table II*

| Additive | Color after days exposure | | | |
|---|---|---|---|---|
| | 1 | 7 | 14 | 42 |
| Control | Tan | Dark brown. | Very dark brown. | Very dark brown. |
| Bis(p-1,1,3,3-tetramethylbutylphenyl)-4,6-dihydroxyisophthalate. | Very light light tan. | Light tan. | Light tan. | Light brown. |

Similar results are observed when the t-octylphenyl ester used above is replaced by the t-butyl, t-amyl, and isopropyl diesters of 4,6-dihydroxyisophthalic acid. In like manner, the above results are shown when the stabilizers of this invention are incorporated into other polymeric and copolymeric formulations based upon vinylidene chlorides and vinyl chlorides.

By way of contrast when the t-octyl phenyl ester used above was replaced by the methyl and the ethyl ester, the compositions exhibited little more stability than the unstabilized control.

What is claimed is:

Bis(p-1,1,3,3 - tetramethylbutylphenyl)-2,4-dihydroxyisophthalate having the formula:

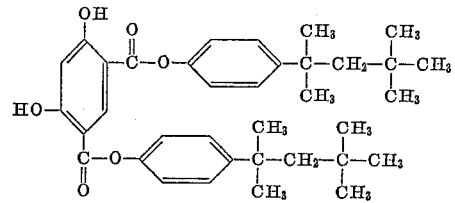

characterized by being a white solid melting at 196.5°–197.5° C.

References Cited in the file of this patent

UNITED STATES PATENTS

| 1,984,283 | Reid et al. | Dec. 11, 1934 |
| 2,464,172 | Britton et al. | Mar. 8, 1949 |
| 2,464,250 | Moll et al. | Mar. 15, 1949 |
| 2,584,160 | Sahyun | Feb. 5, 1952 |
| 2,594,350 | Sahyun | Apr. 29, 1952 |
| 2,666,039 | Reid et al. | Jan. 12, 1954 |
| 2,952,661 | Gordon et al. | Sept. 13, 1960 |

OTHER REFERENCES

Nauta: Chem. Abst., 44, 8338 (1959).